US011012894B1

(12) United States Patent
Oroskar et al.

(10) Patent No.: US 11,012,894 B1
(45) Date of Patent: May 18, 2021

(54) MANAGEMENT OF CARRIER USAGE BY RELAYS AND CSFB CAPABLE UES

(71) Applicant: Sprint Spectrum L.P., Overland Park, KS (US)

(72) Inventors: Siddharth S. Oroskar, Overland Park, KS (US); Jasinder P. Singh, Olathe, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 224 days.

(21) Appl. No.: 16/185,650

(22) Filed: Nov. 9, 2018

Related U.S. Application Data

(63) Continuation of application No. 15/079,692, filed on Mar. 24, 2016, now Pat. No. 10,149,207.

(51) Int. Cl.
*H04W 36/00* (2009.01)
(52) U.S. Cl.
CPC ... *H04W 36/0016* (2013.01); *H04W 36/0022* (2013.01)
(58) Field of Classification Search
CPC .............. H04W 36/0016; H04W 36/0022
See application file for complete search history.

(56) References Cited

U.S. PATENT DOCUMENTS

| 7,480,486 | B1 | 1/2009 | Oh et al. |
| 8,942,762 | B1 | 1/2015 | Oroskar et al. |
| 9,226,210 | B1 | 12/2015 | Saleh et al. |
| 9,253,662 | B1 | 2/2016 | Marupaduga et al. |
| 2011/0103277 | A1 | 5/2011 | Watfa et al. |
| 2011/0158156 | A1* | 6/2011 | Ma ........................ H04L 5/0039 370/315 |
| 2013/0196632 | A1 | 8/2013 | Horn et al. |
| 2014/0233529 | A1 | 8/2014 | Prakash et al. |
| 2014/0301370 | A1 | 10/2014 | Sivavakeesar |
| 2016/0234724 | A1 | 8/2016 | Yang et al. |
| 2016/0234754 | A1* | 8/2016 | Baghel ............. H04W 72/1289 |
| 2016/0337282 | A1 | 11/2016 | Kallio et al. |

* cited by examiner

*Primary Examiner* — Walli Z Butt
*Assistant Examiner* — Thad N Defauw

(57) ABSTRACT

In an example method, a base station determines that a UE is CSFB capable and that the base station is currently serving a relay on a first carrier of a plurality of carriers. The base station provides a coverage area on which to serve UEs, and the coverage area operates on the plurality of carriers. Based on at least the determining that the UE is CSFB capable and that the base station is currently serving the relay on the first carrier, the base station assigns the UE to operate on a carrier of the plurality of carriers other than the first carrier rather than having the UE operate on the first carrier on which the base station is currently serving the relay.

17 Claims, 4 Drawing Sheets

MANAGEMENT OF CARRIER USAGE BY RELAYS AND CSFB CAPABLE UES

CROSS-REFERENCE TO RELATED APPLICATIONS

This disclosure is a continuation of, and claims priority to, U.S. patent application Ser. No. 15/079,692 filed Mar. 24, 2016, which is hereby incorporated by reference in its entirety.

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve user equipment devices (UEs) such as cell phones, tablet computers, tracking devices, embedded wireless modules, and other wirelessly equipped devices. In turn, each base station may be coupled with a switch or gateway that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, such a network may operate in accordance with a particular radio access protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WIFI), BLUETOOTH, and others. Each protocol may define its own procedures for registration of UEs, initiation of communications, handover between base station coverage areas, and other functions.

Each base station may provide wireless service to UEs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a UE on a single such carrier at a time or, with carrier aggregation service or the like, on multiple such carriers at a time.

On each carrier frequency in a coverage area, the coverage area may also define a number of air interface channels for carrying information between the base station and the UEs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that UEs may detect as an indication of coverage and may measure to evaluate coverage strength. As another example, each coverage area may define an uplink control channel or other resource on which UEs may transmit control messages such as registration requests and access requests to the base station. And each coverage area may define a downlink control channel or other resource on which the base station may transmit control messages such as system information messages and page messages to UEs. Each coverage area may then define one or more traffic channels or other resources for carrying communication traffic such as voice data and other data between the base station and UEs.

When a UE first powers on or enters into coverage of the network, the UE may scan for and identify a strongest pilot or reference signal and may register with the network by transmitting a registration request or attach request to a base station providing that signal. This registration process may serve to notify the network of the UE's presence in a particular coverage area and to facilitate network authentication of the UE. Once registered, the UE may then operate in an idle mode in which the UE monitors a downlink control channel to receive overhead information and to check for any page messages. In the idle mode, the UE may have no assigned traffic channel resources on which to engage in bearer communication.

When the network has a communication (such as a voice call or other traffic) to provide to a UE that is registered with the network but is operating in the idle mode, the network may page the UE in an effort to then facilitate assigning traffic channel resources to the UE. In particular, the network may transmit on the downlink a page message addressed to the UE. Assuming the UE receives this page message, the UE may then transmit to the network a page response message on the uplink. And upon receipt of the page response message, the network may then assign traffic channel resources to the UE, for use to carry the communication, thus transitioning the UE to a connected or active mode in which the UE can engage in the communication.

Likewise, when an idle UE seeks to initiate a communication (such as to place a voice call or engage in other bearer communication), the UE may transmit on the uplink to the base station an origination or connection request, and the network may then assign traffic channel resources to the UE for use to carry the communication, similarly transitioning the UE to a connected or active mode in which the UE can engage in the communication.

In normal operation, when a base station operates in such a wireless network, the base station may thus engage in various types of communication with other network entities. Such communication could be categorized into "control-plane communication" and "user-plane communication". The control-plane communication encompasses any of the base station's control signaling with other core network entities to help manage operations in the wireless network and service of UEs, and could thus include communications such as bearer setup signaling, tracking area update signaling, paging, handover signaling, and the like. Whereas, the user-plane communication encompasses bearer data being communicated to or from one or more UEs served by the base station, such as packet data that the base station receives from a gateway system and then schedules/transmits to a UE and packet data that the base station receives from a UE and forwards to a gateway system for transmission on a transport network.

In systems that provide service under more than one air interface protocol, service providers may implement functionality that allows UEs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows UEs to operate by default on LTE and to switch over to operate on the older protocol to engage in voice calls. Further, service providers may implement "enhanced circuit switched fallback" (eCSFB) functionality to make use of certain additional functions that support transition of a UE from operating on one network to another.

Under CSFB, for instance, a hybrid CDMA/LTE UE may be arranged by default to scan for and register with an LTE network and to operate with its CDMA radio powered off, but to then engage in control signaling with the CDMA network via the LTE network, i.e., over the LTE air interface. To facilitate this, when the UE registers with the LTE network, LTE network infrastructure such as a mobility management entity (MME) may signal through an inter-working server (IWS) with the CDMA network to register the UE with the CDMA network as well.

In turn, when the CDMA network has a voice call to connect to the UE, the CDMA network may signal through the IWS to the LTE network to cause the LTE network to transmit a CSFB page message to the UE over the LTE air interface. After further CSFB signaling through the LTE network, the UE may then power on its CDMA radio and tune to the CDMA network to engage in the call over the CDMA air interface.

Optimally, a wireless service provider will strategically implement base stations throughout a market area so that served UEs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled with a UE, referred to as a relay-UE, and the donor base station then serves the relay-UE in much the same way that the donor base station serves other UEs. Further, the relay base station itself serves UEs, in much the same way that any base station would.

OVERVIEW

In practice, a donor base station may have limited air interface resources on which to engage in communication with a relay-UE. By way of example, a donor base station may provide a coverage area on which to serve UEs, with the coverage area operating on a plurality of carriers. Each carrier may have a limited extent of resources for carrying communications between the donor base station and one or more served UEs including any relay-UEs. For instance, the carrier may be divided over time into transmission time intervals (TTIs) and, in each TTI, into control channel space and shared channel space. The control channel space may carry scheduling communications and other control signals between the donor base station and served UEs, and the shared channel space may carry scheduled communications between the donor base station and served UEs.

Further, due to the limited extent of resources on each carrier, a heavy load on a carrier on which a donor base station is serving one or more relay-UEs and perhaps other UEs could be problematic. In particular, a heavy load on a carrier could result in problems such as delays in scheduling and transmission of communications to and from UEs on the carrier.

Given a relay that includes a relay base station and a relay-UE, if a donor base station serves the relay-UE on a carrier that is heavily loaded, that heavy load could pose a special problem for control-plane communications that flow via that carrier between the relay base station and other core network entities. For instance, the heavy load on the carrier could cause delays in the donor base station scheduling those control-plane communications, which could in turn lead to delays in handover, paging, bearer setup, or the like. Those delays in handover, paging, bearer setup, or the like could then lead to poor user experience. By way of example, heavy load on the carrier could result in delays in transmission of handover setup signaling between the relay base station and adjacent base stations, which could lead to dropped calls or other issues. And as another example, heavy load on the carrier could result in delays in transmission of handover signaling or bearer-setup signaling between the relay base station and the MME, which lead to dropped or blocked calls or other issues as well.

In light of the above, it would be advantageous to conserve resources on a carrier that a donor base station is using to serve a relay. Unfortunately, however, CSFB-related signaling on a carrier that a donor base station is using to serve a relay may consume some of the valuable resources on that carrier.

By way of example, when UEs place and receive CSFB calls, certain CSFB-related signaling flows over the air interface between the UEs and their serving base station. This CSFB-related signaling may consume downlink control channel resources and downlink shared channel resources. For instance, in an LTE system, a UE may operate in a discontinuous idle mode in which the UE operates with low power but periodically wakes up to check a downlink control channel space for a paging message provided by a serving base station. In particular, the LTE downlink defines frames of 10 milliseconds each divided into subframes of 1 millisecond each, and the UE may be configured to periodically check one or more "paging occasions" of a downlink control channel in a particular frame and particular subframe(s) in search of a paging indicator. Upon finding such a paging indicator, the UE may then check a corresponding downlink shared channel space to see if there is a paging message for the UE. Paging for a CSFB call thus makes use of at least some downlink control channel resources and at least some downlink shared channel resources on the air interface.

Similarly, eCSFB-related signaling on a carrier that a base station is using to serve a relay may consume some of the valuable resources on that carrier and could potentially consume a greater extent of resources than CSFB-related signaling. For instance, as with paging for a CSFB call, paging for an eCSFB call may make use of at least some downlink control channel resources and at least some downlink shared channel resources. Furthermore, with eCSFB, additional signaling may flow over the air interface between the UEs and their serving base station when setting up a voice call. This additional signaling may consume downlink shared channel resources and uplink control channel resources. For example, with eCSFB, a base station may send a measurement request to the UE on a downlink control channel, and the UE may responsively send a measurement report to the base station on an uplink control channel. This measurement report may, for instance, indicate coverage that the UE has detected from scanning a list of coverage areas. Thus, setting up an eCSFB call generally involves a greater extent of signaling than setting up a CSFB call.

Disclosed herein are methods and system that may help to address this or other issues. In accordance with the disclosure, a base station may differentially allocate carriers to relays and to UEs that are CSFB capable. For example, when a base station is serving a relay on a particular carrier, the base station may intentionally assign a carrier other than the particular carrier to a UE that is CSFB capable. Advantageously, CSFB-related signaling with the UE may then occur on a different carrier than the particular carrier on which the base station is serving the relay.

In one specific implementation, given a choice between: (i) assigning a UE that is CSFB capable to operate on the same carrier on which a base station is serving a relay or (ii) assigning the UE to operate on a different carrier, the base station would opt to assign the UE to operate on the different carrier, so as to have the UE and the relay be served on separate carriers. For example, when a base station is serving a relay on a first carrier, in response to the base station determining that a UE is CSFB capable, the base station may assign a second carrier to the UE.

In another specific implementation, when a base station is going to begin serving a relay, the base station may assign the relay to operate on a carrier on which the base station is currently serving the fewest number of UEs that are CSFB capable, with the assigning being based on a determination that the carrier is the one on which the base station is currently serving the fewest number of UEs that are CSFB capable.

Further, when one or more UEs that are CSFB capable are currently assigned to operate on that carrier, the base station may switch to serving at least one of the UEs that are CSFB capable on a different carrier than the carrier on which the base station is going to begin serving the relay. In this manner, the base station can decrease the extent of CSFB-related signaling that is likely to occur on the carrier on which the base station serves the relay.

Accordingly, in one respect, disclosed is a method for managing carrier frequency assignment to a UE by a base station. The base station provides a coverage area on which to serve UEs, with the coverage area operating on a plurality of carriers. According to the method, the base station determines that a UE is CSFB capable and that the base station is currently serving a relay on a first carrier of the plurality of carriers. Based on at least the determining that the UE is CSFB capable and that the base station is currently serving the relay on the first carrier, the base station assigns the UE to operate on a carrier of the plurality of carriers other than the first carrier rather than having the UE operate on the first carrier on which the base station is currently serving the relay.

In another respect, disclosed is a base station operable in an access network to provide a coverage area in which to serve UEs, with the coverage area operating on a plurality of carriers. The base station includes an antenna structure that radiates to define the coverage area for serving the UEs. The base station further includes a controller comprising at least one processing unit, data storage, and program instructions stored in the data storage and executable by the processing unit to carry out various operations. In particular, the operations include determining that a UE is CSFB capable and that the base station is currently serving a relay on a first carrier of the plurality of carriers. The operations also include, based on at least the determining that the UE is CSFB capable and that the base station is currently serving the relay on the first carrier, assigning the UE to operate on a carrier of the plurality of carriers other than the first carrier rather than having the UE operate on the first carrier on which the base station is currently serving the relay.

In still another respect, another method for managing carrier frequency assignment in a radio access network is provided. The radio access network comprises a base station that provides a coverage area in which to serve UEs, with the coverage area operating on a plurality of carriers. According to the method, the base station determines that the base station is going to begin serving a relay. Further, the base station determines a particular carrier of the plurality of carriers on which the base station is currently serving a fewest number of UEs that are CSFB capable. And based on the particular carrier being the carrier of the plurality of carriers on which the base station is currently serving the fewest number of UEs that are CSFB capable, the base station assigns the relay to operate on the particular carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present methods and system will be described herein in the context of a system that supports both LTE service and CDMA service. However, it will be understood that the principles of the disclosure can extend to apply in other scenarios as well, such as with respect to other air interface protocols. Further, even within the context of a system that supports both LTE service and CDMA service, numerous variations form the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Further, it will be understood that, while reference may be made to CSFB functionality in various portions of the disclosure, the disclosure may equally apply to eCSFB functionality as well as to other variations of CSFB.

Figure 1:
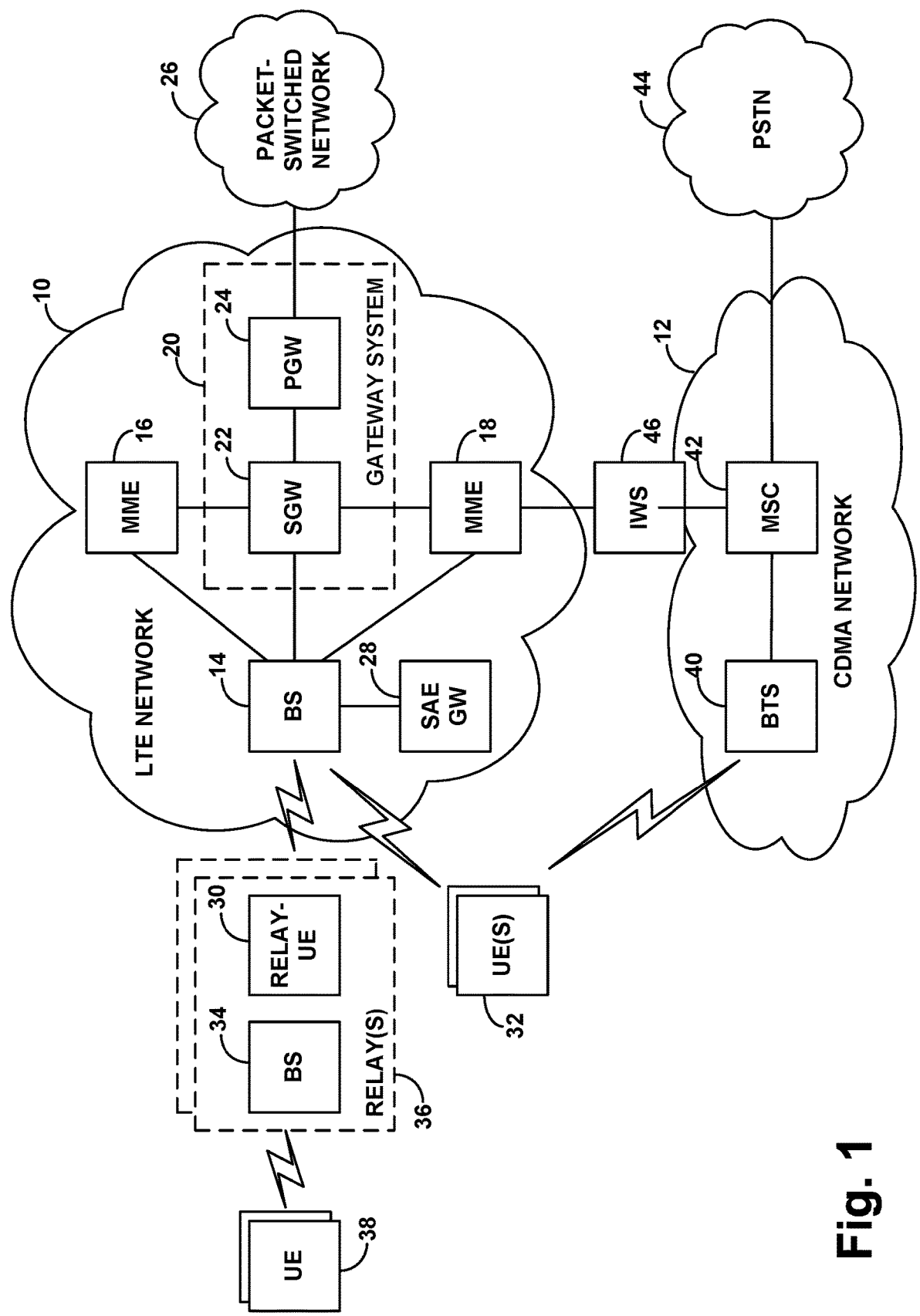
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts a representative LTE network 10 that primarily serves UEs with wireless packet data communication service, including possibly voice-over-packet service, but may also provide other functions. The LTE network 10 may be a packet-switched network, compliant with the industry standard system architecture evolution (SAE) for the LTE protocol. FIG. 1 also depicts a representative CDMA network 12 that primarily serves UEs with circuit-switched voice call service, but may also provide other functions.

As shown, LTE network 10 includes an example base station (BS) 14, which has an antenna structure and associated equipment (not shown) for providing LTE coverage in which to serve the UEs. The base station 14 then has communication interfaces with two example MMES 16, 18, each functioning as an example signaling controller for the LTE network 10. Further, the base station 14 has a communication interface with a gateway system 20, which includes a serving gateway (SGW) 22 and a packet-data-network gateway (PGW) 24. The PGW 24 provides connectivity with a packet-switched transport network 26 such as the Internet, and each MME 16, 18 has a respective communication interface with the SGW 22 as well. As further shown, LTE network 10 then also includes, and base station 14 has an interface with, a special gateway depicted as an "SAE GW" 28, which serves to provide connectivity within the LTE network 10, for a relay-UE and relay base station as noted above for instance.

Additionally shown in FIG. 1, within coverage of base station 14, are then a plurality of UEs, including at least one relay-UE 30 and at least one non-relay UE 32. Each non-relay UE 32 may be an end-user UE such as one of the types of UEs noted above (e.g., cell phone, tablet computer, tracking device, etc.) that is not set to provide wireless backhaul connectivity for a relay base station. Whereas, each relay-UE 30 may be a UE that is set to provide wireless backhaul connectivity for a relay base station 34. As such, a relay-UE could be a conventional UE (e.g., cell phone or the like) that is locally coupled with a base station and that is configured to operate as a relay-UE for the relay base station, or the relay-UE could be a UE module that is incorporated within a base station, thereby allowing the base station to obtain wireless backhaul connectivity and thus function as a relay base station. Further, base station 14 serves as a donor base station for relay 36, relay 36 has a wireless backhaul connection with the donor base station 14, and relay 36 then provides its own wireless coverage for serving one or more other UEs 38.

In practice, each of these UEs may be configured within the LTE network 10 as a device to be served by the network (such as authorized subscriber device), and a mechanism may be provided to distinguish relay-UEs from conventional UEs, so as to facilitate treating relay-UEs differently than conventional UEs. By way of example, a relay-UE may have a special identifier or be served by the network under a special network identifier (e.g., a special public land mobile network (PLMN) identifier, or special packet data network (PDN) connection identifier), indicating that the relay-UE will be operating as a relay-UE. Whereas a conventional UE may have an identifier or be served by the network under an identifier that does not indicate the UE will be operating as a relay-UE and thus that may establish the UE is not a relay-UE. Thus, when a UE attaches with the network, such as with base station 14, the network (e.g., the base station, MME, and/or other network entity) may determine whether the UE is a relay-UE (i.e., whether the UE provides wireless backhaul connectivity for a relay base station) or not, based on such identification or other information provided by the UE during attachment or noted in a network profile record for the UE.

The CDMA network 12, on the other hand, is shown including a representative CDMA base station 40 known as a base transceiver stations (BTS), which includes an antenna structure and associated equipment for engaging in CDMA communication over an air interface of a coverage area with UEs. The BTS 40 is then shown in communication (possibly through a base station controller (BSC) or radio network controller (RNC) (not shown)) with a mobile switching center (MSC) 42 that manages paging over the CDMA air interface and that provides connectivity with the public switched telephone network (PSTN) 44.

Further shown in FIG. 1 is then an IWS 46, which functions to facilitate interworking between the LTE network 10 and the CDMA network 12, so as to facilitate CSFB functionality for instance. In practice, the IWS may be provided as a function or element of either the LTE network 10 or the CDMA network 12. For instance, the IWS may be provided as a function of MSC 42 in CDMA network 12.

LTE network 10, CDMA network 14, and IWS 46 may be owned and operated by a common wireless service provider, and the service provider may configure the networks to interwork with each other to allow for interworking between the networks, again to facilitate CSFB or the like. Alternatively, the networks may be owned and/or operated by separate wireless service providers, and those service providers may have an agreement with each other to allow for interworking between the networks, again to facilitate CSFB or the like.

In practice with this LTE/CDMA arrangement, the base station 14 may broadcast an overhead signal such as a System Information Block #8 (SIB8) that includes data that a UE 32 may programmatically interpret to mean that the LTE coverage area in which the overhead signal is broadcast is one that supports CSFB functionality. The UE may then detect this broadcast signal and responsively register with the LTE network. Under LTE principles, the UE may do so by transmitting an attach request to the base station 14, including in the attach request data that indicates capabilities of the UE and particularly an indication that the UE supports CSFB functionality.

Upon receipt of this attach request, the LTE network may register presence of the UE in a coverage area of the base station 14. For instance, base station 14 may signal to MME 18 to trigger this registration. Further, in response to the attach request indicting that the UE supports CSFB functionality, MME 18 may also signal to IWS 46 to trigger registration of the UE with the CDMA network 14. In particular upon receipt of the signal from MME 18, IWS 46 may signal to MSC 42, and the MSC (in cooperation with a home location register and/or other network infrastructure) may register the fact that the UE is currently served by the LTE network 10. Alternatively, after sending the attach request to the base station 14, the UE may register with the CDMA network 12 via the LTE network 10, the MME 18, and the IWS 46.

When the MSC 42 receives a request to connect a call to the UE, the MSC may then send to the IWS 46 a page request, and the IWS may in turn signal to the MME 18. The MME may then signal to the serving base station 14 to trigger paging of the UE over the LTE air interface. And the serving base station 14 may transmit a CSFB page to the UE, and the UE may transmit to the serving base station a CSFB extended service request message, which the base station may forward to the MME. Likewise, if the UE seeks to originate a CSFB call, the UE may establish connectivity with the serving base station if necessary and may then send a CSFB extended service request message to the base station, which the eNodeB may similarly forward to the MME.

In practice, base station 14 may have limited air interface resources on which to engage in communications with relay-UE 30. In particular, in line with the discussion above, base station 14 may provide service on one or more carriers each having a defined, finite frequency bandwidth, and each carrier may have a limited of extent of resources for carrying communications between the base station and one or more served UEs including relay-UE 30. Specifically, as further discussed above, the carrier may be divided into control channel space and shared channel space, with the control channel space carrying scheduling communications and other control signals between base station 14 and served UEs, and the shared channel space carrying scheduled communications between base station 14 and served UEs.

As noted above, difficulty can arise when a carrier on which a base station is serving a relay-UE is heavily loaded. In particular, as noted, that heavy load may result in delayed transmission of communications between the base station and the relay-UE, which could pose problems with control-plane communications passing to and from relay base station 34. For example, delays in control-plane communication with relay base station 34 could result in issues such as dropped or blocked calls. Hence, it would be advantageous to conserve resources on a carrier that base station 14 serves relay 34.

Unfortunately, however, as further noted above, CSFB-related signaling on a carrier that a base station is using to serve a relay may consume some of the valuable resources on that carrier. In particular, paging for a CSFB call may consume downlink control channel resources and downlink shared channel resources on the carrier. In a similar manner, as noted above, eCSFB-related signaling on a carrier that a base station is using to serve a relay may generally consume an even greater extent of the valuable resources on that carrier. For instance, setting up an eCSFB call may involve additional signaling that consumes downlink shared channel resources and uplink control channel resources on the carrier as well.

The present methods and system help address this or other problems by differentially allocating carriers to relays and to UEs that are CSFB capable. For example, when a base station is serving a relay on a particular carrier, the base station may intentionally assign a carrier other than the particular carrier to a UE that is CSFB capable, so as to have the UE and the relay be served on separate carriers. Similarly, when a base station is going to begin serving a relay, the base station may determine a carrier on which the base station is currently serving the fewest number of UEs that are CSFB capable, and assign the relay to operate on that carrier.

Features of these methods and system can be carried out at the base station 14. In practice, for instance, the base station 14 could be configured to determine whether or not a UE (such as UE 32) is CSFB capable. In line with the discussion above, when a UE registers with the LTE network 10, the UE may send an attach request to the base station 14, including in the attach request data that indicates capabilities of the UE. This data may particularly include an indication of whether or not a UE supports CSFB functionality. Thus, the base station 14 may determine that a UE is CSFB capable by determining that the received capability data includes an indication that the UE supports CSFB functionality. Similarly, the UE may transmit capability data to the base station 14 in a system message other than an attach request, and the base station 14 may interpret data in the system message to indicate that the UE is CSFB capable.

Alternatively, the base station 14 could receive from an MME data corresponding to a particular UE, and use the data received from the MME to determine whether or not the particular UE is CSFB capable. For example, an MME (such as MME 16) may be communicatively coupled to a home subscriber server (HSS) which stores subscriber information, such as information related to UEs served by base station 14. The information may include indications of whether or not particular UEs are CSFB capable. During attachment of a UE with base station 14, MME may receive from the HSS a network profile record corresponding to the UE, and send the network profile record to base station 14. Base station 14 may thus determine that the UE is CSFB capable by determining that the network profile record for the UE includes an indication that the UE supports CSFB functionality.

The base station 14 could also be configured to determine whether the base station is currently serving any relays, and if so, on which carrier(s). In practice, for instance, the base station 14 may determine whether or not it is serving any relay-UEs based on identification or other information provided by UEs during attachment or noted in a network profile record for the UEs. Upon the base station identifying a relay-UE that the base station is currently serving, the base station may determine which carrier(s) the base station is currently serving the relay-UE on. By way of example, when the relay-UE initially attaches to the base station, the relay-UE and the base station may engage in signaling to establish a radio-link-layer connection (i.e., air interface connection) on a particular carrier. For instance, the relay-UE and the base station may exchange radio-resource-control (RRC) configuration messaging in order to prepare the base station to serve the relay-UE on the carrier and to prepare the relay-UE to be served on the carrier. In this process, the base station may store a context record for the relay-UE, indicating that the base station is serving the relay-UE on the particular carrier. Hence, the base station may refer to the context record for the relay-UE to determine which carrier the base station is currently serving the relay-UE on.

Further, the base station 14 could be configured such that, based on at least determining that a UE is CSFB capable and that the base station is serving a relay on a particular carrier, the base station assigns the UE to operate on a different carrier than the particular carrier on which the base station is currently serving the relay. In practice, to assign the UE to operate on a different carrier than the particular carrier, the base station may transmit to the UE an RRC connection message (e.g., an initial RRC connection message, or an RRC reconfiguration connection message) that specifies the different carrier on which the base station will be serving the UE, identifying the carrier by its global identifier, for instance.

In line with the discussion above, because eCSFB involves a greater extent of signaling than CSFB, determining that a UE is eCSFB capable may provide more of a reason to assign the UE to operate on a different carrier than the particular carrier on which the base station is serving a relay. Thus, in some examples, based on at least determining that a UE is eCSFB capable and that the base station is serving a relay on a particular carrier, the base station may assign the UE to operate on a different carrier than the particular carrier on which the base station is currently serving the relay.

Further, there may also be additional triggers that cause the base station 14 to assign the UE that is CSFB capable to operate on a different carrier than a carrier on which the base station is currently serving a relay. As one example, the base station 14 could be configured to determine that a particular carrier on which the base station is currently serving the relay 34 has threshold high load (e.g., a threshold load at which problems like those noted above might occur). Carrier load could be defined in various ways, perhaps averaged over a recent sliding window of time. For example, the load could be defined as an extent (e.g., percentage or other measure) of all carrier resources used (e.g., carrying communications), an extent of shared channel resources used, an extent of control channel resources used, or a quantity of UEs served on the carrier (perhaps those having active or connected state). Other examples are possible as well. Based on at least determining that (i) the UE is CSFB capable, (ii) the base station is serving the relay on the particular carrier, and (iii) the particular carrier has threshold high load, the base station may then responsively assign the UE to operate on a different carrier than the particular on which the base station is currently serving the relay (i.e., switch the UE's assigned carrier).

As another example, the base station 14 could be configured to determine that the UE that is CSFB capable is currently assigned to operate on the particular carrier on which the base station is serving the relay (e.g., by referring to the context record for the UE). Based on at least determining that (i) the UE is CSFB capable, (ii) the base station is serving the relay on the particular carrier, and (iii) the UE is currently assigned to operate on the particular carrier, the base station may then responsively assign the UE to operate on a different carrier than the particular on which the base station is currently serving the relay.

As still another example, the base station 14 could be configured to determine that a probability of the UE engaging in CSFB communication is higher than a threshold. The base station 14 could determine the probability based on one or any combination of the time of day or day of week, and compare the probability to the threshold. For instance, the base station 14 could store mapping data which correlates time of day with probability, and the base station 14 could refer to the mapping data to determine a particular probability at a particular time of day. Additionally or alternatively, the base station 14 could determine the probability based on a record of past CSFB communications by the UE (e.g., a record of past CSFB communications stored by an MME or other network entity). For instance, the base station could store mapping data which correlates a number of past CSFB communications. The base station could then determine a number of CSFB communications by the UE during a sliding window of time, and refer to the mapping data to determine a particular probability corresponding to the number of CSFB communications. Based on at least determining that (i) the UE is CSFB capable, (ii) the base station is serving the relay on the particular carrier, and (iii) the probability of the UE engaging in CSFB communication is higher than the threshold, the base station may then respon- sively assign the UE to operate on a different carrier than the particular on which the base station is currently serving the relay.

Further in line with the discussion above, the base station 14 could be configured to determine that the base station is going to begin serving a relay. In practice, for instance, when a UE registers with the base station, the base station could determine, using any of the mechanisms mentioned above, that the UE will be operating as a relay-UE. The base station could interpret the determination that the UE will be operating as a relay-UE to mean that the base station is going to begin serving a relay.

The base station 14 could also be configured to determine the carrier on which the base station is currently serving the fewest number of UEs that are CSFB capable. In practice, for instance, the base station could be configured to refer to context records for UEs that the base station is currently serving to identify, per carrier, the number of UEs that the base station is currently serving. Further, the base station could be configured to use any of the above-referenced mechanisms to determine, for each carrier, the number of UEs that are CSFB capable. From the per carrier numbers of UEs that are CSFB capable, the base station could then identify the carrier having the fewest number of UEs that are CSFB capable. Based on the identified carrier being the carrier on which the base station is currently serving the fewest number of UEs that are CSFB capable, the base station may then responsively assign the relay to operate on the identified carrier.

Further, when the base station is going to begin serving a relay on a particular carrier and/or after a base station begins serving a relay on a particular carrier, the base station 14 could be configured to identify a UE that is currently assigned to operate on the particular carrier and is CSFB capable. In practice, for instance, the base station could be configured to refer to context records for UEs that the base station is currently serving to identify one or more UEs that are currently assigned to operate on the particular carrier, and use any of the above-referenced mechanisms to determine that a particular one of the identified one or more UEs is CSFB capable. Based at least on the particular carrier being the carrier on which the base station is going to begin serving the relay or the carrier on which the base station is already serving the relay, the base station may then responsively re-assign the particular UE to operate on the a different carrier than the particular carrier.

Figure 2:
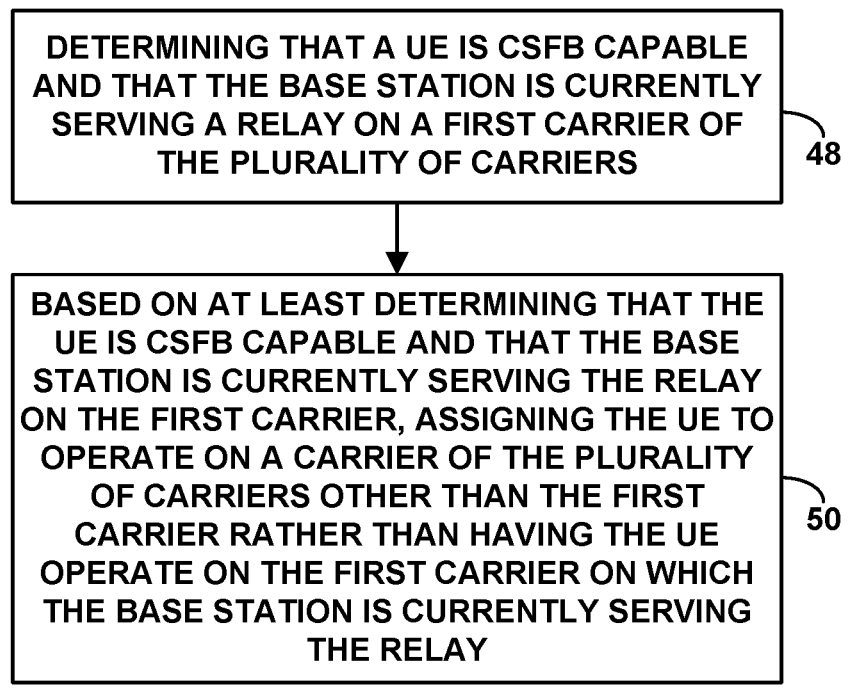
FIG. 2 is a flow chart depicting example operations in accordance with the disclosure.

FIG. 2 is next a flow chart depicting some of these operations in an example method, to manage carrier frequency assignment to a UE by a base station, where the base station provides a coverage area on which to serve UEs and the coverage area operates on a plurality of carriers. As shown in FIG. 2, at block 48, the method includes determining that a UE (e.g., UE 32) is CSFB capable and that the base station is currently serving a relay (e.g., relay 36) on a first carrier of the plurality of carriers. At block 50, the method then further includes, based on at least determining that the UE is CSFB capable and that the base station is currently serving the relay on the first carrier, assigning the UE to operate on a carrier of the plurality of carriers other than the first carrier rather than having the UE operate on the first carrier on which the base station is currently serving the relay. Advantageously, the act of assigning the UE to operate on the carrier other than the particular carrier on which the base station is currently serving the relay may help conserve resources on the particular carrier.

In line with the discussion above, this process can be carried out by a base station. For instance, the process could be carried out by a base station when a UE that is CSFB capable registers with the base station. Additionally or alternatively, the process could be carried out by a base station when the base station or a network entity determines that a carrier on which the base station is serving a relay has threshold high load.

In this process, the act of determining that a UE is CSFB capable could involve (i) receiving data from the UE indicating one or more capabilities of the UE and (ii) determining that the received data includes an indication that the UE is CSFB capable. Further, the act of determining that the base station is currently serving the relay on the first carrier could involve determining that the base station is currently serving a relay-UE on the first carrier.

Further in line with the discussion above, the act of assigning the UE to operate on the carrier other than the first carrier on which the base station is currently serving the relay could be carried out responsive to the base station making one or more additional determinations in combination with the determination that the UE is CSFB capable and that the base station is currently serving the relay on the first carrier.

Figure 3:
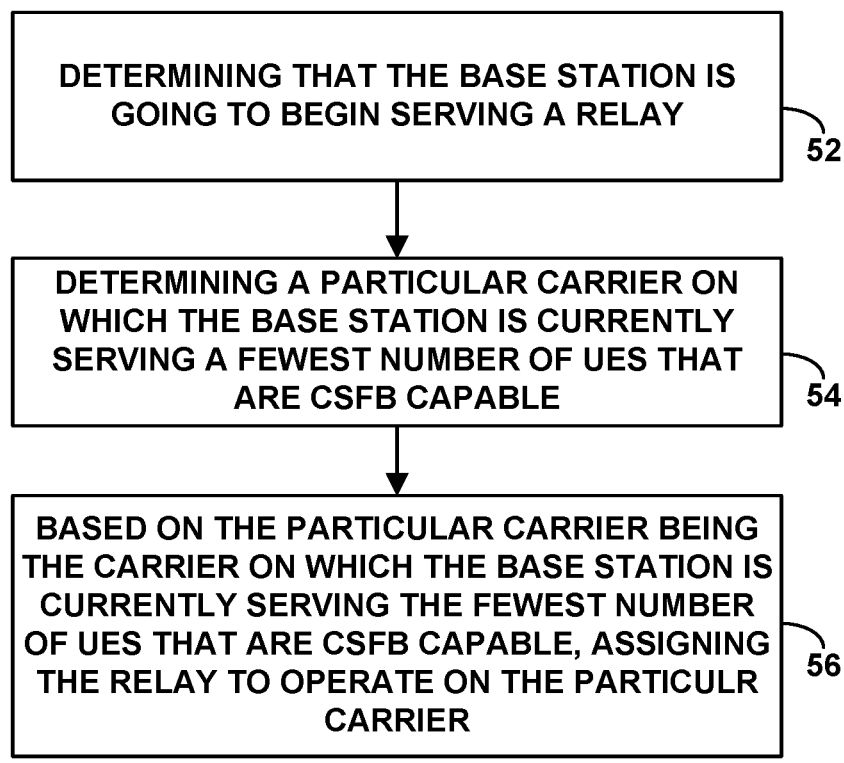
FIG. 3 is another flow chart depicting example operations in accordance with the disclosure.

FIG. 3 is next another flow chart also depicting some of the above operations in an example method, to manage carrier frequency assignment in a radio access network. The radio access network may include a base station that provides a coverage area in which to serve UEs, with the coverage area operating on a plurality of carriers. As shown in FIG. 3, at block 52, the method includes determining that the base station is going to begin serving a relay. At block 54, the method further includes determining a particular carrier of the plurality of carriers on which the base station is currently serving a fewest number of UEs that are CSFB capable. And at block 56, the method then further includes, based on the particular carrier being the carrier of the plurality of carriers on which the base station is currently serving the fewest number of UEs that are CSFB capable, assigning, by the base station, the relay to operate on the particular carrier.

In line with the discussion above, this process can be carried out by a base station. For instance, the process could be carried out by a base station when a relay-UE attaches to the base station. Further, in this process, the act of determining that the base station is going to begin serving the relay on the first carrier could involve determining that the base station is going to begin serving a relay-UE on the first carrier.

Figure 4:
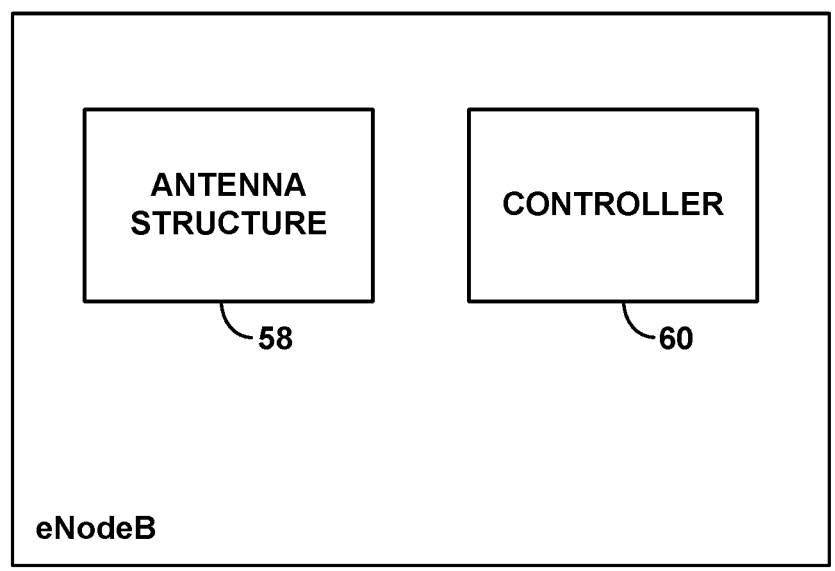
FIG. 4 is a simplified block diagram of an example base station operable in accordance with the disclosure.

Finally, FIG. 4 is a simplified block diagram of an example base station operable in an access network to provide a coverage area in which to serve UEs, with the coverage area operating on a plurality of carriers. As shown, the example base station includes an antenna structure 58 that radiates to define the coverage area for serving UEs. Further, the example base station includes a controller 60 that manages carrier frequency assignment to UEs.

In practice, for instance, the controller 60 may include at least one processing unit, data storage, and program instructions stored in the data storage and executable by the at least one processing unit to carry out various operations described herein. Controller 60 could be implemented using hardware, software, and/or firmware. The program instructions stored in the data storage could be machine language instructions or other executable instructions stored on a non-transitory computer readable medium (e.g., volatile and/or non-volatile memory). The instructions, when executed by the one or more processors, may cause controller 60, and thus the base station, to carry out the various base station operations described herein.

In line with the discussion above, the base station operations could include (i) determining that a UE is CSFB capable and that the base station is currently serving a relay on a first carrier of the plurality of carriers and (ii) based on at least the determining that the UE is CSFB capable and that the base station is currently serving a relay on the first carrier, assigning the UE to operate on a carrier of the plurality of carriers other than the first carrier rather than having the UE operate on the first carrier on which the base station is currently serving the relay. Exemplary embodiments have been described above. Those skilled in the art will understand, however, that changes and modifications may be made to these embodiments without departing from the true scope and spirit of the invention.

We claim:

1. A method for managing carrier frequency assignment by a base station, wherein the base station provides a coverage area on which to serve a plurality of user equipment devices (UEs), wherein each of one or more UEs of the plurality of UEs is a relay, wherein each of one or more other UEs of the plurality of UEs is a non-relay, and wherein the coverage area operates on a plurality of carriers, the method comprising:
    determining, by the base station, that a UE is a non-relay rather than a relay; and
    responsive to determining that the UE is a non-relay rather than a relay, transitioning, by the base station, the UE from operating on a first carrier on which the base station is serving at least one relay to operating on a carrier of the plurality of carriers selected based on the base station not serving any relays on the carrier.

2. The method of claim 1, wherein determining that the UE is a non-relay rather than a relay comprises determining that the UE is not a relay-UE that provides wireless backhaul connectivity for a relay base station.

3. The method of claim 1, further comprising:
    determining that the base station is serving at least one relay on the first carrier of the plurality of carriers; and
    based on the determining that the base station is serving at least one relay on the first carrier of the plurality of carriers, selecting a different carrier than the first carrier as the carrier of the plurality of carriers.

4. The method of claim 1, wherein transitioning the UE to operating on the carrier of the plurality of carriers comprises:
    identifying multiple carriers of the plurality of carriers on which the base station is not serving any relays; and
    selecting the carrier of the plurality of carriers from among the multiple carriers of the plurality of carriers.

5. The method of claim 2, wherein determining that the UE is not a relay-UE comprises determining that the UE is not a relay-UE based on an identifier provided by the UE during attachment to the base station.

6. The method of claim 2, wherein determining that the UE is not a relay-UE comprises determining that the UE is not a relay-UE based on a context record for the UE.

7. The method of claim 3, wherein determining that the base station is serving at least one relay on the first carrier comprises determining that the base station is serving a relay-UE on the first carrier, wherein the relay-UE provides wireless backhaul connectivity for a relay base station.

8. The method of claim 3, further comprising:
    determining that UE is currently assigned to operate on the first carrier, wherein the transitioning is further based on the determining that the UE is currently assigned to operate on the first carrier.

9. The method of claim 4, wherein identifying the multiple carriers of the plurality of carriers comprises identifying multiple carriers of the plurality of carriers on which the base station is not serving any relay-UEs.

10. A base station operable in an access network to provide a coverage area in which to serve a plurality of UEs, wherein one or more UEs of the plurality of UEs are relays, wherein one or more other UEs of the plurality of UEs are non-relays, and wherein the coverage area operates on a plurality of carriers, the base station comprising:
an antenna structure that radiates to define the coverage area for serving the plurality of UEs; and
a controller comprising at least one processing unit, data storage, and program instructions stored in the data storage and executable by the processing unit to carry out operations comprising:
determining that a UE is a non-relay rather than a relay, and
responsive to determining that the UE is a non-relay rather than a relay, transitioning the UE from operating on a first carrier on which the base station is serving at least one relay to operating on a carrier of the plurality of carriers selected based on the base station not serving any relays on the carrier.

11. The base station of claim 10, wherein determining that the UE is a non-relay rather than a relay comprises determining that the UE is not a relay-UE that provides wireless backhaul connectivity for a relay base station.

12. The base station of claim 10, wherein the operations further comprise:
determining that the base station is serving at least one relay on the first carrier of the plurality of carriers; and
based on the determining that the base station is serving at least one relay on the first carrier of the plurality of carriers, selecting a different carrier than the first carrier as the carrier of the plurality of carriers.

13. The base station of claim 10, wherein transitioning the UE to operating on the carrier of the plurality of carriers comprises:
identifying multiple carriers of the plurality of carriers on which the base station is not serving any relays; and
selecting the carrier of the plurality of carriers from among the multiple carriers of the plurality of carriers.

14. A method for managing carrier frequency assignment by a base station, wherein the base station provides a coverage area on which to serve user equipment devices (UEs), and wherein the coverage area operates on a plurality of carriers, the method comprising:
determining, by the base station, that the base station is going to begin serving a relay on a first carrier of the plurality of carriers;
identifying, by the base station, a non-relay UE being served on the first carrier on which the base station is going to begin serving the relay; and
based at least on the determining that the base station is going to begin serving the relay on the first carrier, re-assigning, by the base station, the non-relay UE to operate on another carrier of the plurality of carriers other than the first carrier on which the base station is going to begin serving the relay.

15. The method of claim 14, wherein determining that the base station is going to begin serving a relay on the first carrier comprises:
receiving an attach request from a UE, the attach request including data indicating that the UE will be operating as a relay-UE; and
determining, based on the data indicating that the UE will be operating as a relay-UE, that the base station is going to begin serving a relay.

16. The method of claim 14, wherein identifying the non-relay UE being served on the first carrier comprises:
identifying a UE being served by the base station on the first carrier; and
determining, based on data indicating one or more capabilities of the UE, that the UE is a non-relay UE.

17. The method of claim 16, further comprising receiving the data indicating the one or more capabilities of the UE from a mobility management entity.

* * * * *